United States Patent
Park et al.

(10) Patent No.: US 10,525,874 B2
(45) Date of Patent: Jan. 7, 2020

(54) STRUCTURE FOR FIXING SUNROOF LIGHTING MODULE

(71) Applicants: Hyundai Motor Company, Seoul (KR); Kia Motors Corporation, Seoul (KR); Webasto Donghee Holdings, Ulsan (KR)

(72) Inventors: Hoo Sang Park, Gyeonggi-do (KR); Chang Min Park, Busan (KR)

(73) Assignees: Hyundai Motor Company, Seoul (KR); Kia Motors Corporation, Seoul (KR); Webasto Donghee Holdings, Ulsan (KR)

( * ) Notice: Subject to any disclaimer, the term of this patent is extended or adjusted under 35 U.S.C. 154(b) by 0 days.

(21) Appl. No.: 16/033,761

(22) Filed: Jul. 12, 2018

(65) Prior Publication Data

US 2019/0176690 A1 Jun. 13, 2019

(30) Foreign Application Priority Data

Dec. 11, 2017 (KR) ........................ 10-2017-0168976

(51) Int. Cl.
*B60Q 3/208* (2017.01)
*F21V 29/70* (2015.01)
*B60Q 3/54* (2017.01)
*B60Q 3/64* (2017.01)
*B60Q 3/80* (2017.01)
*B60J 7/043* (2006.01)

(52) U.S. Cl.
CPC .............. *B60Q 3/208* (2017.02); *B60Q 3/54* (2017.02); *B60Q 3/64* (2017.02); *B60Q 3/80* (2017.02); *F21V 29/70* (2015.01); *B60J 7/043* (2013.01); *B60Q 2500/10* (2013.01)

(58) Field of Classification Search
CPC . B60Q 3/208; B60Q 3/54; B60Q 3/64; B60Q 3/80; B06J 7/043; F21V 29/70
See application file for complete search history.

(56) References Cited

U.S. PATENT DOCUMENTS

| | | | |
|---|---|---|---|
| 2010/0117405 A1* | 5/2010 | Kimizuka | B60J 7/0015 296/214 |
| 2013/0058115 A1* | 3/2013 | Pfeil | G02B 6/001 362/511 |
| 2019/0001875 A1* | 1/2019 | Xu | B60Q 3/51 |

FOREIGN PATENT DOCUMENTS

KR 10-2013-0136875 12/2013

\* cited by examiner

*Primary Examiner* — Anabel Ton
(74) *Attorney, Agent, or Firm* — Mintz Levin Cohn Ferris Glovsky and Popeo, P.C.; Peter F. Corless

(57) ABSTRACT

A structure for fixing a sunroof lighting module is formed by coupling a panel cover, a light guide, and a fixing clip. The structure for fixing the sunroof lighting module includes: a sunroof which is positioned at an opening of a roof of a vehicle; and a lighting module which is positioned on at least one end of the sunroof, in which the lighting module includes: an upper panel cover and a lower panel cover which are configured to surround a light source; and a light guide unit which is coupled to one end of the upper panel cover to face the light source, and the light guide unit includes: a light guide which is configured to transmit light emitted from the light source; and a fixing clip which is configured to fix the light guide and the upper panel cover.

10 Claims, 4 Drawing Sheets

US 10,525,874 B2

STRUCTURE FOR FIXING SUNROOF LIGHTING MODULE

CROSS-REFERENCE TO RELATED APPLICATION

This application claims under 35 U.S.C. § 119(a) the benefit of Korean Patent Application No. 10-2017-0168976 filed Dec. 11, 2017, the entire contents of which are incorporated herein by reference.

BACKGROUND

(a) Technical Field

The present disclosure relates to a structure for fixing a sunroof lighting module, more particularly, to a structure for fixing a sunroof lighting module that is positioned on at least one end of a sunroof glass and is configured to maintain a minimum distance between a light source and a light guide of the lighting module, thereby minimizing a loss of light which occurs while light emitted from the light source travels along the light guide, and maintaining constant luminous intensity even at a position distant from the light source.

(b) Description of the Related Art

Sunroofs are commonly mounted on vehicles in order to provide ventilation to an interior of a vehicle, e.g., while a vehicle occupant is smoking or during normal driving including long-distance trips, to compensate for a small space in the vehicle, and to ensure openness of the interior of the vehicle.

A sunroof typically includes a glass panel which is made of a glass material and mounted slidably to be able to open and close an opening formed in a roof panel of the vehicle, and the sunroof is configured to open and close the opening by tilting the glass panel or rectilinearly moving the glass panel forward and rearward.

Recently, a panoramic sunroof, which is mounted on the vehicle and has a roof panel entirely having a glass structure, has been preferred by customers.

The panoramic sunroof provides a driver and other vehicle occupants with a more pleasant ride quality while the vehicle travels during the day, since the panoramic sunroof improves openness in comparison with a typical sunroof, but there is a problem in that the effect of the sunroof is not great because an outside environment is not visible while the vehicle travels at night. In particular, the driver or other occupants may experience greater enjoyment while seeing falling rain or snow through the sunroof when it rains or snows, but the typical sunroof cannot provide this function at night.

In certain vehicles, lighting modules have been positioned at the periphery of the sunroof glass in order to provide ambient light, thereby imparting pleasant ride quality to the driver and/or other vehicle occupants even while the vehicle travels at night as well as while the vehicle travels during the day time.

FIG. 1 (PRIOR ART) illustrates a sunroof 1 positioned on a roof panel 2 of a vehicle, and illustrates multiple lighting modules 3 configured to surround the sunroof 1.

As shown, in the related art, the multiple lighting modules are installed along the sunroof of the vehicle and used to provide the ambient light at a user's request.

However, in the case of the lighting modules in the related art, there are problems in that the multiple lighting modules are required, a difference in luminous intensity occurs in accordance with a distance from a light source, and a loss of light occurs because the light source and a light guide are distant from each other.

The above information disclosed in this Background section is only for enhancement of understanding of the background of the disclosure and therefore it may contain information that does not form the prior art that is already known in this country to a person of ordinary skill in the art.

SUMMARY

The present disclosure provides a structure for fixing a sunroof lighting module, in which a light source and a light guide are positioned to face each other.

The present disclosure also provides a structure for fixing a sunroof lighting module, in which a light guide is fixed while being in contact with a panel cover including a light source.

The present disclosure further provides a structure for fixing a sunroof lighting module that includes a double fixing structure for coupling a light source and a light guide.

To achieve the objects of the present disclosure, a structure for fixing a sunroof lighting module includes the following configurations.

In one aspect, the present disclosure provides a structure for fixing a sunroof lighting module, the structure including: a sunroof which is positioned at an opening of a roof of a vehicle; and a lighting module which is positioned on at least one end of the sunroof, in which the lighting module includes: an upper panel cover and a lower panel cover which are configured to surround a light source; and a light guide unit which is coupled to one end of the upper panel cover to face the light source, and the light guide unit includes: a light guide which is configured to transmit light emitted from the light source; and a fixing clip which is configured to fix the light guide and the upper panel cover.

In a preferred embodiment, the fixing clip may be rotated to be fixed to a fastening unit positioned at one end of the upper panel cover.

In another preferred embodiment, the light guide may be inserted into the fastening unit.

In still another preferred embodiment, the fastening unit may include: multiple vertical grooves which are positioned in a longitudinal direction of the sunroof; and one or more protruding portions which are positioned between the multiple vertical grooves.

In yet another preferred embodiment, the protruding portions may provide a predetermined tension to the inserted light guide when the fixing clip is rotated and coupled to the fastening unit.

In still yet another preferred embodiment, the structure may further include a printed circuit board ("PCB") which is positioned in the panel cover.

In a further preferred embodiment, the structure may further include a control unit which is connected to the PCB and configured to control the lighting module.

In another further preferred embodiment, the structure may further include a heat dissipation plate which is connected to the panel cover.

In still another further preferred embodiment, the structure may further include a fixing member which is configured to fix the fixing clip to a roof panel.

In yet another further preferred embodiment, the upper panel cover may include a guide groove so that the fixing clip is rotated and fixed, and a guide protruding portion positioned at one end of the fixing clip may be fixed by being rotated along the guide groove.

In still yet another further preferred embodiment, the lighting module may be positioned along a rail unit of the sunroof.

The present disclosure may obtain the following effects through combinations of the aforementioned present exemplary embodiments and configurations to be described below, and a use relationship.

According to the present disclosure, there is an effect of reducing a loss of light by minimizing the distance between the light source and the light guide of the lighting module.

According to the present disclosure, since the double fixing structure is provided between the light guide and the panel cover, there is an effect of maintaining a constant optical performance even when the vehicle vibrates or sways.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
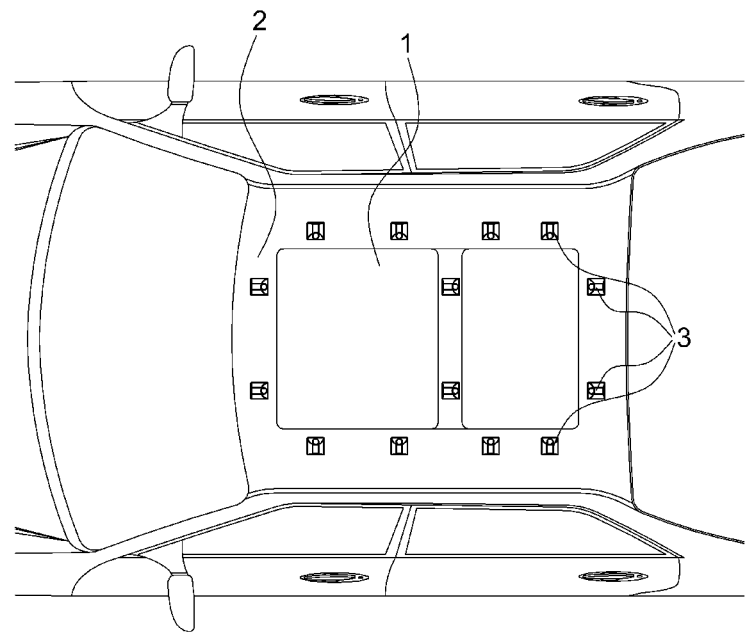
FIG. 1 (PRIOR ART) illustrates lighting modules in the related art which are positioned to surround a sunroof.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, an exemplary embodiment of the present disclosure will be described in more detail with reference to the accompanying drawings. The exemplary embodiment of the present disclosure may be modified in various forms, and the scope of the present disclosure should not be interpreted as being limited to the following exemplary embodiment. The present exemplary embodiment is provided for more completely explaining the present disclosure to the person with ordinary skill in the art.

The present disclosure relates to a structure for fixing a sunroof lighting module positioned on at least one end of a circumference of a sunroof, and the lighting module is configured to provide ambient light along the sunroof in accordance with a user's selection.

Figure 2:
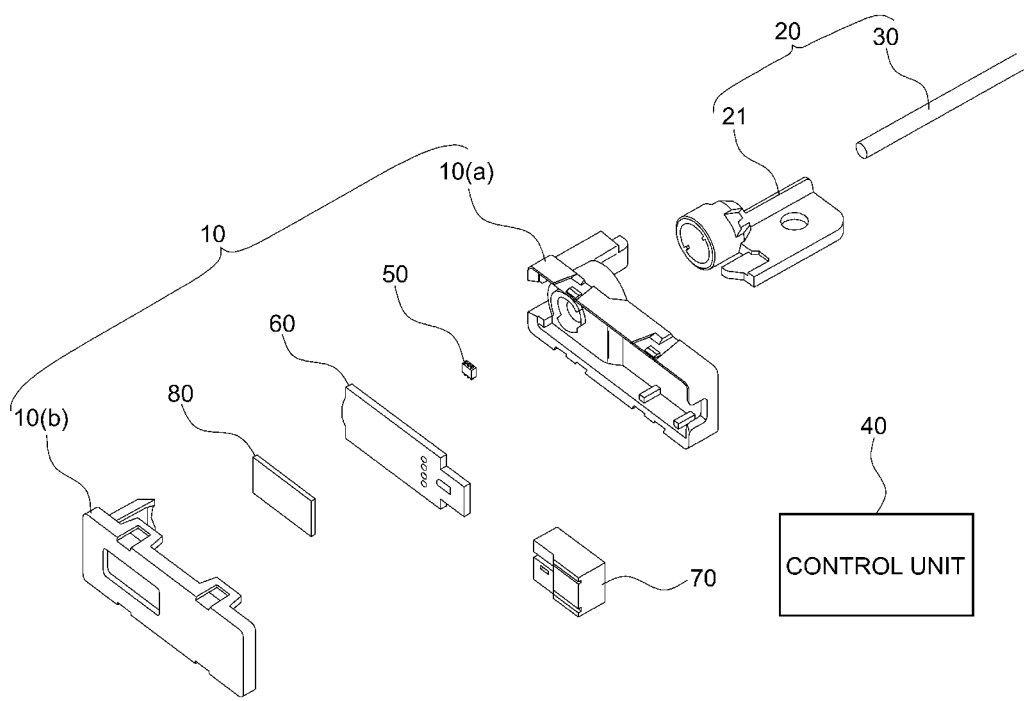
FIG. 2 is a view illustrating components of a structure for fixing a sunroof lighting module according to an exemplary embodiment of the present disclosure.

FIG. 2 is a configuration view of a structure for fixing a sunroof lighting module according to an exemplary embodiment of the present disclosure.

As shown, a panel cover 10 is provided to be fixed to a roof panel 100, and there are provided a light source 50 positioned inside the panel cover 10, a printed circuit board ("PCB") 60 connected to the light source 50, a heat dissipation plate 80 configured to dissipate heat from the PCB 60, and a connector 70 configured to connect a control unit 40 to the PCB 60.

The PCB 60 connected to the light source 50 is connected, by the connector 70, to the control unit 40 positioned in the vehicle, and the control unit 40 may set luminous intensity, colors, time, and the like of the light source 50 at the user's request, thereby providing ambient light through the lighting module.

The panel cover 10 is configured such that an upper panel cover 10a and a lower panel cover 10b face each other, and the panel cover 10 is fixed to the roof panel 100 in a state in which the light source 50, the PCB 60, and the like are positioned in the panel cover 10.

The upper panel cover 10a is configured to be fastened to a light guide unit 20 positioned in a longitudinal direction of a sunroof rail unit 110, and the light guide unit 20 includes a light guide 30 and a fixing clip 21 for fixing the light guide 30.

The fixing clip 21 according to the present disclosure is coupled to a fastening unit 11 positioned at one end of the upper panel cover 10a. The fixing clip 21 may be coupled along multiple vertical grooves 13 positioned at the fastening unit 11, and the fixing clip 21 is rotated by a predetermined angle so that one or more protruding portions 12 positioned between the vertical grooves 13 provide a predetermined tension to the light guide 30.

According to the exemplary embodiment of the present disclosure, the one or more protruding portions 12 each have a conical shape and are configured such that the fixing clip 21 may be freely inserted into the fastening unit 11.

Figure 3:
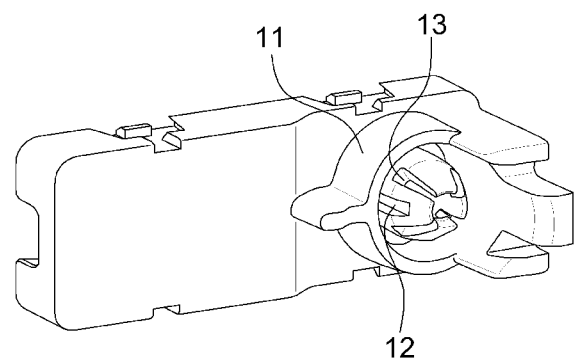
FIG. 3 is a perspective view of an upper panel cover according to the exemplary embodiment of the present disclosure.

FIG. 3 is a perspective view of a configuration of the upper panel cover 10a according to the present disclosure. The upper panel cover 10a has the multiple vertical grooves 13 formed at one end of the upper panel cover 10a which is connected to the light guide 30.

The fastening unit 11 positioned on the upper panel cover 10a is configured such that the light guide 30 is inserted into the fastening unit 11, and the inserted light guide 30 faces the light source 50 positioned in the panel cover 10. Moreover, the fastening unit 11 includes the multiple vertical grooves 13 positioned to surround the inserted light guide 30.

The protruding portions 12 positioned between the one or more vertical grooves 13 are configured to support the light guide 30. The fixing clip 21, which is coupled to the fastening unit 11 along the vertical grooves 13, is rotated by a predetermined angle and comes into contact with ends of the protruding portions 12 in order to apply a predetermined pressure to the ends of the protruding portions 12, thereby allowing a predetermined tension to be maintained at a position where the light guide 30 and the fastening unit 11 are in contact with each other.

In particular, the fixing clip 21 is fastened along the fastening unit 11 and rotated by a predetermined angle, and in this case, guide grooves 14 may be formed in one surface of the fastening unit 11 which faces the fixing clip 21, and guide protruding portions 22 positioned at one end of the fixing clip 21 may be rotated along the guide groove 14.

Figure 4:
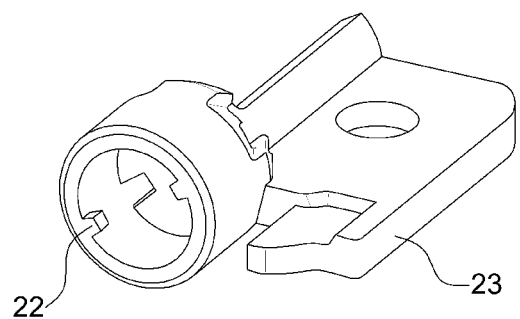
FIG. 4 is a perspective view of a fixing clip according to the exemplary embodiment of the present disclosure.

FIG. 4 is a perspective view of the fixing clip 21 configured to be fastened to the upper panel cover 10a according to the present disclosure.

As shown, one end of the fixing clip 21 is configured to be fastened to the upper panel cover 10a and configured to be rotatable.

In particular, the fixing clip 21 configured to penetrate the light guide 30 may be configured to be fastened to the fastening unit 11 of the upper panel cover 10a, and the guide protruding portions 22 positioned at one end of the fixing clip 21, which faces the upper panel cover 10a, may be configured to be rotated along the guide grooves 14 positioned in the upper panel cover 10a.

The guide grooves 14 are configured such that the guide protruding portions 22 are rotated by a predetermined angle, and the fixing clip 21 inserted along the multiple vertical grooves 13 is rotated such that an inner surface of the fixing clip 21 presses the light guide 30 while coming into contact with the protruding portions 12.

In summary, the fixing clip 21 is inserted along the fastening unit 11, and the guide protruding portions 22 positioned at one end of the inserted fixing clip 21 are rotated along the guide grooves 14 positioned in the fastening unit 11, thereby providing force that presses the inner surface of the fixing clip 21 against the protruding portions 12 of the fastening unit 11.

In particular, the inner surface of the fixing clip 21 has the same shape as an outer surface of the inserted fastening unit 11, such that the fixing clip 21 is inserted along the vertical grooves 13 positioned in the fastening unit 11.

That is, the fixing clip 21 has a shape corresponding to the configuration of the vertical grooves 13 of the fastening unit 11, such that the fixing clip 21 is freely inserted into the fastening unit 11 along the vertical grooves 13. In addition, the inserted fixing clip 21 is rotated to be fixed at the position corresponding to the protruding portions 12 positioned between the multiple vertical grooves 13, thereby applying a predetermined pressure to the protruding portions 12.

Figure 5:
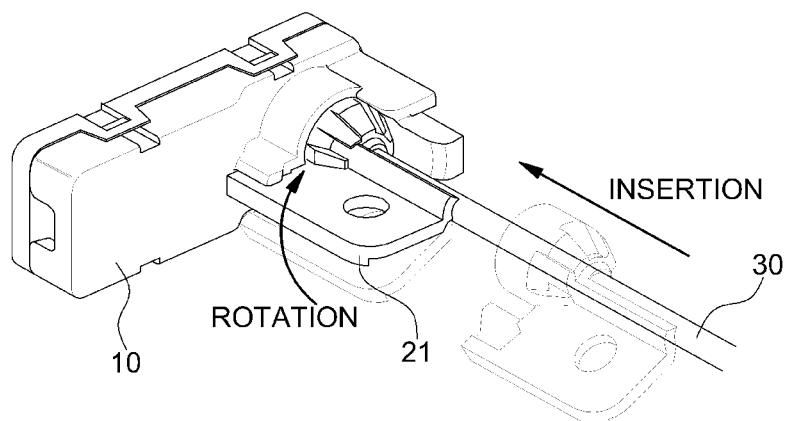
FIG. 5 is a coupled perspective view of the structure for fixing a sunroof lighting module according to the exemplary embodiment of the present disclosure.

FIG. 5 illustrates a state in which the upper panel cover 10a, the light guide 30, and the fixing clip 21 according to the present disclosure are coupled.

As shown, the light guide 30 is inserted into and positioned in the upper panel cover 10a, and the fixing clip 21 is inserted into the fastening unit 11 of the upper panel cover 10a along the light guide 30. In particular, the fixing clip 21 may be configured to be inserted along the multiple vertical grooves 13 positioned in the fastening unit 11.

The fixing clip 21 inserted into the fastening unit 11 is configured to be rotatable by a predetermined angle, and the fixing clip 21 is rotated while the guide protruding portions 22 positioned at one end of the fixing clip 21 are moved along the guide grooves 14 positioned in the inner surface of the fastening unit 11.

As described above, the panel cover 10, the light guide 30, and the fixing clip 21 are fastened to one another, and as a result, the structure for fixing a lighting module according to the present disclosure is configured to be fixed to the roof panel 100 of the vehicle. More particularly, the structure for fixing a lighting module may further include a fixing member 90 formed to be fixed to the roof panel 100 through a hole positioned in the fixing clip 21.

Figure 6:
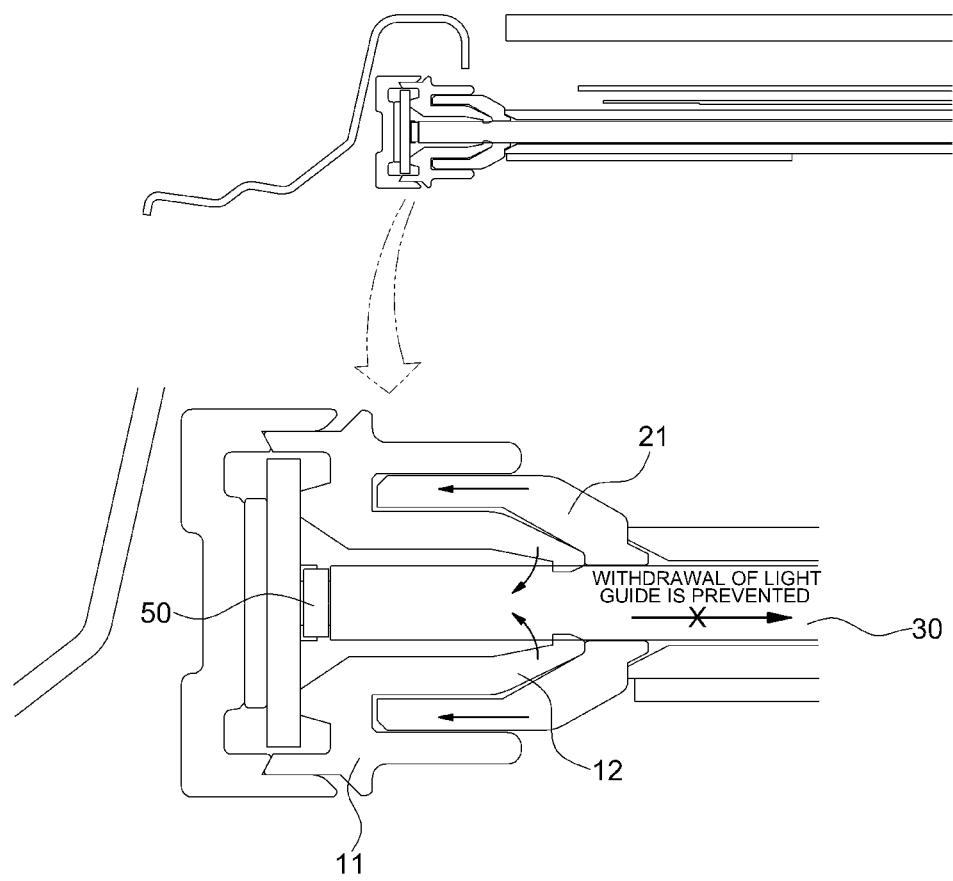
FIG. 6 is a cross-sectional side view of the structure for fixing a sunroof lighting module according to the exemplary embodiment of the present disclosure.

FIG. 6 is a cross-sectional side view of a coupled configuration of the structure for fixing a lighting module according to the exemplary embodiment of the present disclosure.

As described with reference to FIGS. 3 to 5, the light source 50 positioned in the panel cover 10 is configured to be inserted into the upper panel cover 10a so as to face the light guide 30. In particular, the light source 50 according to the present disclosure may be configured by using a luminescent diode or a light emitting diode (LED).

According to a cross-sectional configuration of the panel cover 10, the fixing clip 21, and the light guide 30 which are fastened to one another, the light source 50 and the light guide 30 remain in contact with each other, and the fixing clip 21 inserted along the vertical grooves of the fastening unit 11 is rotated and coupled such that the protruding portions 12 positioned between the vertical grooves 13 receive force applied inward.

As described above, the fixing clip 21 is configured to be inserted into the fastening unit 11 of the panel cover 10 and rotatable by a predetermined angle, thereby maintaining a predetermined tension that allows the protruding portions 12 of the fastening unit 11 to fix the light guide 30.

The guide grooves 14 positioned in one surface of the fastening unit 11, which faces the fixing clip 21, are fastened to the guide protruding portions 22 of the fixing clip 21 so that the fixing clip 21 is rotated by a predetermined angle, and the fixing clip 21 is rotated to a position where the inner surface of the fixing clip 21 presses the protruding portions 12 of the fastening unit 11.

Figure 7:
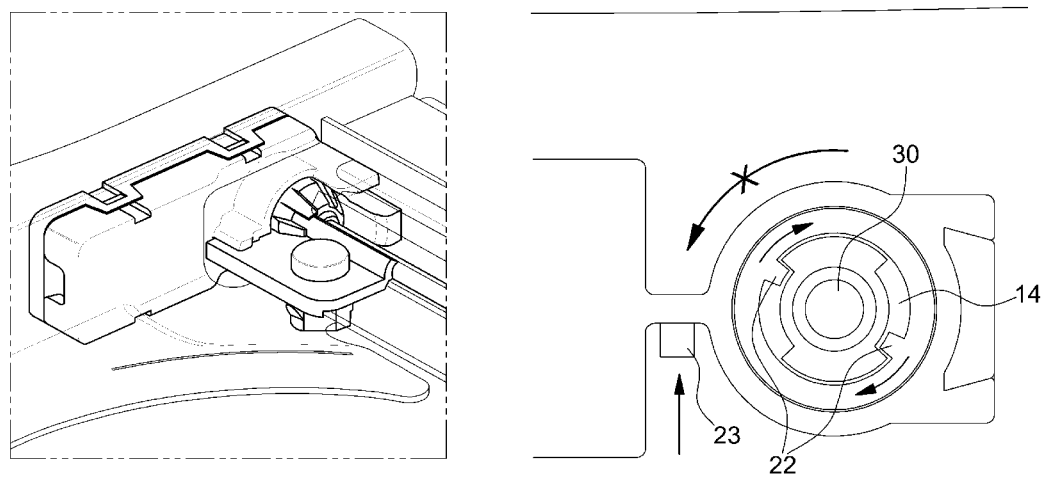
FIG. 7 is a cross-sectional front view of the structure for fixing a sunroof lighting module according to the exemplary embodiment of the present disclosure.

FIG. 7 illustrates a state in which the guide grooves 14 positioned in the fastening unit 11 of the panel cover 10 and the guide protruding portions 22 positioned at one end of the fixing clip 21 are fastened to each other, and the fixing clip 21 is rotated.

To provide tension for fixing the light guide 30 as described above, the fixing clip 21 inserted into the fastening unit 11 along the multiple vertical grooves 13 needs to be rotated to press the protruding portions 12, and a rotation angle of the fixing clip 21 may be set by the guide grooves 14.

The structure for fixing a lighting module includes a stopping portion 23 positioned at one end of the fastening unit 11, such that it is possible to set a rotation amount of the fixing clip 21.

According to the exemplary embodiment of the present disclosure, an angle by which the fixing clip 21 may be rotated may be set by the guide grooves 14 which is positioned in the fastening unit 11 that faces the fixing clip 21, and by the stopping portion 23 which is disposed outside the fastening unit 11 and has a plate shape.

In summary, an angle by which the fixing clip 21 inserted into the fastening unit 11 along the guide grooves 14 of the fastening unit 11 may be rotated may be set by the stopping portion 23 and the guide groove 14, and as a result, it is possible to determine a position where the inner surface of the fixing clip 21 faces the protruding portions 12 of the fastening unit 11 and is fixed to provide a predetermined tension to the protruding portions 12.

Figure 8:
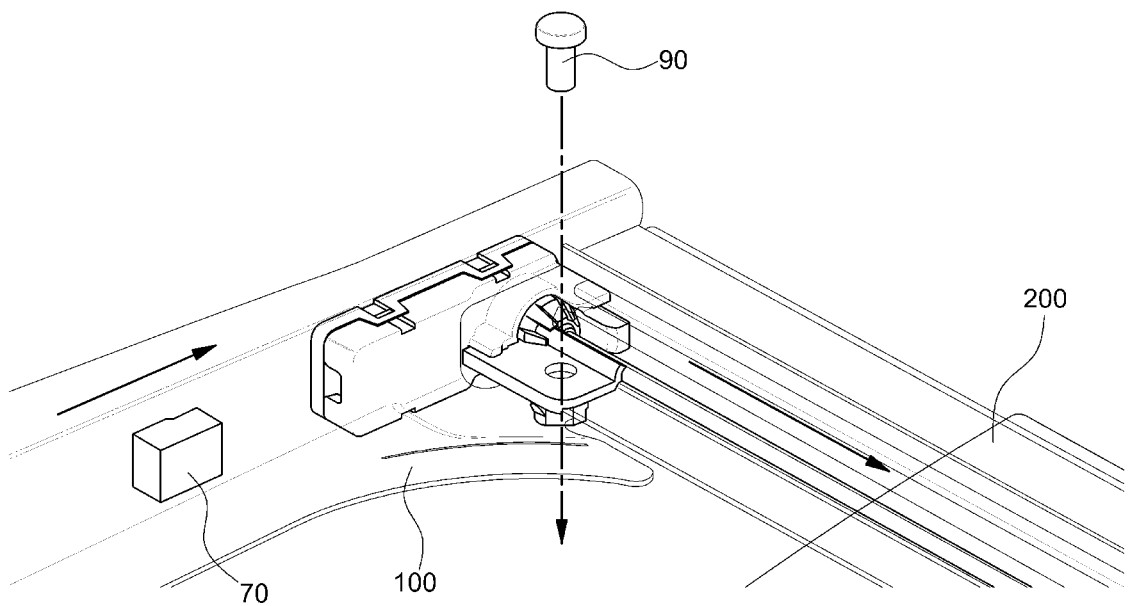
FIG. 8 is a coupled view in which the structure for fixing a sunroof lighting module according to the exemplary embodiment of the present disclosure is positioned.

FIG. 8 is a coupled view illustrating a state in which the structure for fixing a lighting module according to the present disclosure is installed on the roof panel 100 of the vehicle.

As shown, the panel cover 10 is configured to be fastened onto the roof panel 100, and the fixing clip 21 including the plate-shaped stopping portion 23 includes the fastening hole, such that the fixing member 90 is fixed to the roof panel 100 through the fastening hole.

The fixing member 90 positioned in the fastening hole remains fixed so that the fixing clip 21 is rotated to provide a predetermined tension to the protruding portions 12 of the fastening unit 11.

In particular, the fixing member 90, which fixes the fixing clip 21 through the fastening hole, may be configured in the form of a bolt, a clip, or an adhesive, and includes any suitable fixing form such as a type commonly used by those skilled in the art.

According to the exemplary embodiment of the present disclosure, the light guide 30 may be configured to be positioned in the longitudinal direction along the rail unit 110 positioned on the roof panel 100 so that the sunroof is moved, and as a result, it is possible to provide ambient light to a lower surface of the sunroof.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A structure for fixing a sunroof lighting module, the structure comprising:
    a sunroof which is positioned at an opening of a roof of a vehicle;
    a lighting module which is positioned on at least one end of the sunroof, wherein the lighting module includes:
        an upper panel cover and a lower panel cover which are configured to surround a light source; and
        a light guide unit which is coupled to one end of the upper panel cover to face the light source, and the light guide unit includes:
            a light guide which is configured to transmit light emitted from the light source; and
            a fixing clip which is configured to fix the light guide and the upper panel cover; and
    a fixing member which is configured to fix the fixing clip to a roof panel.

2. The structure of claim 1, wherein the fixing clip is rotated to be fixed to a fastening unit positioned at one end of the upper panel cover.

3. The structure of claim 2, wherein the light guide is inserted into the fastening unit.

4. The structure of claim 2, wherein the fastening unit includes:
    multiple vertical grooves which are positioned in a longitudinal direction of the sunroof; and
    one or more protruding portions which are positioned between the multiple vertical grooves.

5. The structure of claim 4, wherein the protruding portions provide a predetermined tension to the inserted light guide when the fixing clip is rotated and coupled to the fastening unit.

6. The structure of claim 1, further comprising:
    a printed circuit board (PCB) which is positioned in the panel cover.

7. The structure of claim 6, further comprising:
    a control unit which is connected to the PCB and configured to control the lighting module.

8. The structure of claim 6, further comprising:
    a heat dissipation plate which is connected to the panel cover.

9. The structure of claim 1, wherein the upper panel cover includes a guide groove so that the fixing clip is rotated and fixed, and a guide protruding portion positioned at one end of the fixing clip is fixed by being rotated along the guide groove.

10. The structure of claim 1, wherein the lighting module is positioned along a rail unit of the sunroof.

* * * * *